United States Patent Office 3,436,374
Patented Apr. 1, 1969

3,436,374
TRIOXANE COPOLYMERS AND PROCESS OF PRODUCING THE SAME
Wolfgang von der Emden and Ernst-Ulrich Köcher, Leverkusen, Germany, assignors to Farbenfabriken Bayer Aktiengesellschaft, Leverkusen, Germany, a German corporation
No Drawing. Filed Apr. 27, 1965, Ser. No. 451,323
Claims priority, application Germany, June 27, 1964, F 43,287
Int. Cl. C08g 9/04, 1/04
U.S. Cl. 260—67      8 Claims

ABSTRACT OF THE DISCLOSURE

Copolymers of trioxane and an aliphatic diazo compound and process of producing the same by reaction in the presence of a cationic catalyst at a temperature between 20 and 110° C.

---

It is known that trioxane can be converted into linear high molecular weight polyoxymethylenes under the influence of cationic initiators. However, homopolymers of trioxane are readily and quantitatively degraded into monomeric formaldehyde by heat treatment or by the influence of catalytic quantities of acids or alkalis. The stability of the polymer may be increased by incorporating copolymers which ensure that the chains not only consist of formaldehyde units, but also contain ether units between the formaldehyde units. Suitable for use as comonomers are cyclic compounds, for example ethylene oxide, 1,3-dioxolane and their thio analogues as well as some unsaturated compounds, such as styrene and acrylonitrile.

A process for the production of new trioxane copolymers has now been found, in which trioxane is reacted with 0.5 to 10 mol percent, based on the amount of trioxane used, of an aliphatic diazo compound in the presence of a cationic catalyst, optionally in a solvent.

The fact that trioxane (the cyclic trimer of formaldehyde) and aliphatic diazo compounds react together to form high molecular weight copolymers is surprising because monomeric formaldehyde cannot be copolymerised with diazo compounds. Various aldehydes are known to react with diazo compounds in a 1:1 ratio to form epoxides, ketones and aldehydes. Formaldehyde itself reacts with diazo compounds to form a variety of low molecular weight substances (Angewandte Chemie 55, 118 (1942)). If cationic catalysts are present, a polyoxymethylene is formed in which the diazo compound is not incorporated.

The following aliphatic diazo compounds are examples of suitable comonomers for the polymerisation of trioxane: alkyl diazo compounds, the alkyl groups containing preferably 1 to 6 carbon atoms, such as diazomethane, diazoethane, diazo-n-propane, diazo-n-butane, diazo-isobutane, diazo-n-pentane and diazo-n-hexane; alkenyl diazo compounds, such as vinyl diazomethane; cycloalkyl diazo compounds containing preferably 5 to 7 carbon atoms, such as diazo cyclopentadiene; halogenated aliphatic diazo compounds, such as trifluorodiazoethane and aliphatic diazomethanes substituted in the alkyl group, for example aryl-substituted diazo compounds such as phenyl diazomethane, diphenyl diazomethane; diazo ketones such as diazoacetone, 1-diazo-butan-2-one, 3-diazo-butan-2-one, diazoacetyl acetone, 3-chlorodiazoacetone, 3,3,3-trichlorodiazoacetone, ω-diazoacetophenone, ω-diazo-o-nitroacetophenone, α-naphthoyldiazomethane, and diazo acetic esters and diazoacetonitrile.

The same copolymers are obtained from diazomethane and trioxane as from trioxane and 1,3-dioxolane, i.e. products corresponding to the formula:

$$(CH_2O)_mCH_2CH_2O(CH_2O)_nCH_2CH_2O—CH_2O$$

In contrast to the copolymerisation of trioxane and dioxolane, a lower concentration of catalyst may be used in the copolymerisation of trioxane and diazomethane. The reason for this is that the cyclic acetals, for example dioxolane, generally have the property of retarding the polymerisation of trioxane as compared with the homopolymerisation, that is to say they weaken the activity of the catalyst, so that, as the amount of comonomer is increased, the concentration of the catalyst has to be increased too. However, in the case of diazomethane the catalyst may be used in the quantity sufficient for homopolymerisation.

The higher homologues of diazomethane and diazomethanes substituted by functional groups yield correspondingly substituted polymers which generally cannot be obtained by processes starting from the substituted dioxolanes (Houben-Weyl, vol. 14, 2, p. 561). The properties of the polymers may be influenced to a considerable extent, for example their dyeability may be improved, by choosing suitable diazo-compounds.

The polymers may be prepared, for example, by dissolving trioxane and the diazo compound in an aliphatic aromatic or chlorinated hydrocarbon, preferably cyclohexane, benzene, toluene, methylene chloride, chloroform and carbon tetrachloride. The solvents are preferably used in the same quantities as the trioxane, although they may be used in quantities of at most three times larger, so that clear solutions are obtained at 30 to 40° C. The quantity in which the diazo compound is used may vary from 0.5 to 10 mol percent, based on the trioxane.

Polymerisation is initiated by adding a cationic catalyst, such as a Lewis acid, for example boron fluoride or its adducts with diethyl ether, di-n-butyl ether, tetrahydrofuran or formamide; trialkyl oxonium salts such as triethyl oxonium fluoborate and carboxonium salts such as diethoxy carbonium fluoborate, phenyl dimethoxy carbonium fluoborate, diethoxy carbonium hexachloroantimonate or 2-methyl dioxolenium fluoborate. These initiators are used in quantities of 0.1 to 2% by weight, based on trioxane.

The reaction temperature is between 20 and 110° C., preferably between 40 and 80° C., depending on the solvent used. The reaction time may be between 1 and 20 hours, although it is preferably between 3 and 6 hours. After this time, the insoluble precipitated polymer is separated from the solvent and washed, for example, with acetone. In order to obtain a stable product, the catalyst has to be removed and some of the polymer degraded. This may be done separately or in one operation. The catalyst either may be dissolved out of the polymer with aqueous or alcoholic solutions of inorganic or organic bases, preferably with aqueous sodium hydroxide solution, or may be combined as a salt by adding an organic base, and thereafter remain in the polymer. Suitable organic bases include, for example, pyridine, quinoline, tributyl amine, N-methyl diethanolamine, triethanolamine and bis-propoxylated cyclohexylamine. The loosely combined formaldehyde may be degraded in an alkaline solution, for example by heating the product in aqueous sodium hydroxide solution to a temperature between 80 and 100° C., simultaneously with the removal of the catalyst, or even purely thermally by melting the polymer at temperatures in the range from 180 to 220° C.

EXAMPLE 1

0.2 ml. of $BF_3 \cdot$di-n-butyl ether is introduced into a solution of 100 g. trioxane in 100 ml. of cyclohexane at 70° C. A solution of 1 g. of diazomethane in 80 ml. of cyclohexane is then added dropwise over a period of 2 hours. The solution clouds after a few minutes, a deposit being precipitated. The solution is left to react for 6 hours at 70° C., after which 16 g. of a fibrous product are obtained. It is stirred for 10 hours at 95° C. in 100 ml. of 5% sodium hydroxide solution. After suction-filtering, 12 g. of a product are obtained which undergoes an hourly loss of weight of 5% at 222° C.

EXAMPLE 2

1.0 ml. of boron fluoride etherate is added dropwise at 40° C. over a period of 5 hours to a solution of 90 g. of trioxane and 11.8 g. of phenyl diazomethane in 100 ml. of cyclohexane. The solution is then refluxed for 5 hours. The precipitated polymer is suction-filtered. Yield 89 g. After treatment for 5 hours in 5% aqueous sodium hydroxide solution, a product is obtained which undergoes an hourly loss of weight of 3% at 222° C.

EXAMPLE 3

1 ml. of $BF_3$ etherate is slowly added dropwise at 50° C. to a solution of 90 g. of trioxane and 11.5 g. of diazoacetic ester in 90 ml. of cyclohexane. The solution is then heated for 2 hours to reflux. The precipitated polymer (93 g.) is filtered off and treated for 8 hours with 1 l. of 5% sodium hydroxide solution. Degradation leaves 27 g. of a product which melts at 162 to 164° C. and undergoes an hourly loss in weight of 1.2% at 222° C.

We claim:

1. A process for producing trioxane copolymers which comprises copolymerising trioxane and 0.5 to 10 mol percent based on the amount of trioxane of an aliphatic diazo compound at temperatures between 20 and 110° C. in the presence of a cationic catalyst.

2. A process for producing trioxane copolymers which comprises copolymerising trioxane and 0.5 to 10 mol percent based on the amount of trioxane of an aliphatic diazo compound at temperatures between 20 and 110° C. in the presence of a cationic catalyst and in an organic solvent for said trioxane and said aliphatic diazo compound.

3. The process of claim 1, wherein said aliphatic diazo compound is selected from the group consisting of alkyl diazo compounds, cycloalkyl diazo compounds, alkenyl diazo compounds, halogenated aliphatic diazo compounds, phenyl subsituted alkyl diazo compounds and diazo ketones.

4. The process of claim 1, wherein said aliphatic diazo compound is diazo methane.

5. The process of claim 1, wherein said aliphatic diazo compound is phenyl diazomethane.

6. The process of claim 1, wherein said aliphatic diazo compound is diazo acetic ester.

7. The process of claim 1, wherein said catalyst is selected from the group consisting of Lewis acids, trialkyl oxonium salts and carbooxonium salts.

8. The process of claim 2, wherein said organic solvent is selected from the group consisting of aliphatic, aromatic and chlorinated hydrocarbons.

References Cited

UNITED STATES PATENTS

| 2,795,571 | 6/1957 | Schneider | 260—67 |
| 3,027,352 | 3/1962 | Walling et al. | 260—67 |
| 2,369,371 | 2/1945 | Seiberlich | 260—67.5 |
| 3,061,589 | 10/1962 | Codignola et al. | 260—67 |

OTHER REFERENCES

C. A. Subject Index, vol. 56 (1962 January-June) p. 47n QD7C4, 1962.

WILLIAM H. SHORT, *Primary Examiner.*

L. M. PHYNES, *Assistant Examiner.*

U.S. Cl. X.R.

260—64